(12) United States Patent
Cipullo et al.

(10) Patent No.: US 10,527,480 B2
(45) Date of Patent: Jan. 7, 2020

(54) METHOD OF MEASURING SURFACE OF A LIQUID BY ILLUMINATING THE SURFACE OF THE LIQUID

(71) Applicant: AIRBUS OPERATIONS LIMITED, Bristol (GB)

(72) Inventors: Alessio Cipullo, Bristol (GB); Stephen Lisle-Taylor, Bristol (GB); Stephen Burnell, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 74 days.

(21) Appl. No.: 15/159,437

(22) Filed: May 19, 2016

(65) Prior Publication Data

US 2016/0341591 A1 Nov. 24, 2016

(30) Foreign Application Priority Data

May 20, 2015 (GB) .................................. 1508664.8

(51) Int. Cl.
*G01B 11/06* (2006.01)
*G01F 23/292* (2006.01)

(52) U.S. Cl.
CPC ........ *G01F 23/292* (2013.01); *G01B 11/0608* (2013.01)

(58) Field of Classification Search
CPC .............. G01F 23/292; G01F 23/0061; G01F 23/0069; G01F 23/0076; G01B 11/0608; B65D 90/48
See application file for complete search history.

(56) References Cited

U.S. PATENT DOCUMENTS

| 2,596,897 | A | * | 5/1952 | Haatvedt | ............... G01F 23/292 116/227 |
| 4,339,664 | A | * | 7/1982 | Wiklund | ................... C21B 7/24 250/559.23 |
| 4,722,605 | A | | 2/1988 | Livnat et al. | |

(Continued)

FOREIGN PATENT DOCUMENTS

| DE | 102014217840 A1 * | 3/2016 | ........... G01F 23/292 |
| EP | 1804039 A1 * | 7/2007 | ........... G01F 23/292 |

(Continued)

OTHER PUBLICATIONS

Kawada, Machine generated translation of JP56129822, Oct. 1981.*

(Continued)

*Primary Examiner* — David E Harvey
(74) *Attorney, Agent, or Firm* — Nixon & Vanderhye P.C.

(57) ABSTRACT

A method of measuring a surface of a liquid, the surface of the liquid having an edge which contacts a solid structure and an interior area which does not contact the solid structure. The surface of the liquid and the solid structure are illuminated with a pattern so that an upper part of the pattern is projected onto the solid structure to form an upper projected pattern and a lower part of the pattern is projected onto the interior area of the surface of the liquid to form a lower projected pattern. An image of the upper projected pattern is acquired and analysed to determine a height of the edge of the surface of the liquid. An image of the lower projected pattern is acquired and analysed to determine a characteristic of the interior area of the surface of the liquid.

20 Claims, 7 Drawing Sheets

(56) References Cited

U.S. PATENT DOCUMENTS

| | | | | |
|---|---|---|---|---|
| 6,098,029 | A * | 8/2000 | Takagi | G06T 7/60 |
| | | | | 382/100 |
| 6,516,661 | B1 * | 2/2003 | Spillman, Jr. | G01F 23/0069 |
| | | | | 340/618 |
| 6,782,122 | B1 * | 8/2004 | Kline | G01F 23/292 |
| | | | | 250/223 B |
| 7,383,152 | B1 * | 6/2008 | Moore | F42B 33/0285 |
| | | | | 702/159 |
| 8,184,848 | B2 * | 5/2012 | Wu | G06K 9/00 |
| | | | | 382/100 |
| 9,019,367 | B2 * | 4/2015 | Hoffmann | G01F 23/292 |
| | | | | 348/135 |
| 9,835,446 | B2 * | 12/2017 | Moore | F42B 33/0285 |
| 2003/0121322 | A1 * | 7/2003 | Spillman, Jr. | G01F 23/0069 |
| | | | | 73/149 |
| 2004/0008259 | A1 * | 1/2004 | Gokturk | G01B 11/2509 |
| | | | | 348/207.1 |
| 2004/0031335 | A1 * | 2/2004 | Fromme | G01B 11/24 |
| | | | | 73/865 |
| 2004/0066500 | A1 * | 4/2004 | Gokturk | G01C 11/30 |
| | | | | 356/4.01 |
| 2008/0282817 | A1 * | 11/2008 | Breed | B60C 11/24 |
| | | | | 73/865.9 |
| 2010/0073476 | A1 * | 3/2010 | Liang | G06Q 10/08 |
| | | | | 348/136 |
| 2010/0322462 | A1 | 12/2010 | Wu et al. | |
| 2012/0127290 | A1 * | 5/2012 | Tojo | G01N 21/41 |
| | | | | 348/61 |
| 2012/0314059 | A1 * | 12/2012 | Hoffmann | G01F 23/292 |
| | | | | 348/135 |
| 2013/0342653 | A1 * | 12/2013 | McCloskey | G01S 17/026 |
| | | | | 348/46 |
| 2015/0153212 | A1 * | 6/2015 | Cipullo | G01F 23/292 |
| | | | | 382/203 |
| 2016/0307382 | A1 * | 10/2016 | Herman | G07C 9/00158 |

FOREIGN PATENT DOCUMENTS

| | | | | |
|---|---|---|---|---|
| JP | 56129822 | A * | 10/1981 | G01F 23/292 |
| JP | 58090130 | A * | 5/1983 | G01F 23/292 |
| JP | 2001041803 | A | 2/2001 | |

OTHER PUBLICATIONS http://en.wikipedia.org/wiki/Structured-light_3D_scanner, "Structured-light 3D scanner" dated May 13, 2015, pp. 1-7.

http://www.lmi3d.com/products/hdi/, "World-Class 3D Scanning and Inspection Solutions Engineered from the Chip Level Up" dated May 13, 2015, pp. 1-4.

http://www.gizmag.com/lumigrids-led-projector/27691/ "Lumigrids—the LED projector that keeps cyclists out of potholes" dated May 13, 2015, pp. 1-8.

Likipo Search Report, Great Britain Application No. 1508664.8 dated Nov. 3, 2015.

European Search Report dated Sep. 30, 2016 EP Application No. 16170287.

* cited by examiner

METHOD OF MEASURING SURFACE OF A LIQUID BY ILLUMINATING THE SURFACE OF THE LIQUID

RELATED APPLICATIONS

The present application claims priority from Great Britain Application No. 1508664.8, filed May 20, 2015, the disclosure of which is hereby incorporated by reference herein in its entirety.

FIELD OF THE INVENTION

The present invention relates a method of measuring a surface of a liquid, and related apparatus.

BACKGROUND OF THE INVENTION

U.S. Pat. No. 6,782,122 describes apparatus for measuring height of a surface of liquid in a container utilizing a light source and camera pair disposed above the liquid surface in a predetermined spatial relationship to each other and the container. The light source illuminates the liquid surface with a light pattern and the camera captures the area image of the light pattern in a form of discrete picture elements (pixels) that are processed in an image processor to determine the height of liquid in the container. In another embodiment, the pixels of the area image are further processed to determine attitude of the liquid surface so that the processor may determine the quantity of liquid in the container based on the determined height and attitude of the liquid surface and container geometry data stored in a memory thereof.

Another liquid level detection method is described in US2010/0322462. The method includes capturing an image of a liquid surface, a structural surface, and graduation markings provided on the structural surface using an image-capturing device to thereby obtain an initial image. Subsequently, the initial image is processed so as to generate a processed image, and a level reference value of the liquid surface is obtained from the processed image. The level reference value represents a height of the liquid surface in terms of inherent characteristics of the processed image. Lastly, a liquid level of the liquid surface is calculated based on a relative proportional relation among the level reference value, an overall height of the processed image in terms of the inherent characteristics of the processed image, and dimensions of any one of the initial and processed images relative to the graduation markings.

A method of remote monitoring of fixed structures is described in US2008/0282817. In one embodiment, an optical system is designed to project scales on the inner surface of three walls of a housing, and obtain images of the wail(s) at the projected locations of the scales. This information is used to derive the level of fluid in the tank.

SUMMARY OF THE INVENTION

A first aspect of the invention provides a method of measuring a surface of a liquid, the surface of the liquid having an edge which contacts a solid structure and an interior area which does not contact the solid structure, the method comprising: illuminating the surface of the liquid and the solid structure with a pattern so that an upper part of the pattern is projected onto the solid structure to form an upper projected pattern and a lower part of the pattern is projected onto the interior area of the surface of the liquid to form a lower projected pattern; acquiring an image of the upper projected pattern; analysing the image of the upper projected pattern to determine a height of the edge of the surface of the liquid; acquiring an image of the lower projected pattern; and analysing the image of the lower projected pattern to determine a characteristic of the interior area of the surface of the liquid.

A further aspect of the invention provides apparatus for measuring a surface of a liquid, the surface of the liquid having an edge which contacts a solid structure and an interior area which does not contact the solid structure, the apparatus comprising: an illuminator arranged to illuminate the surface of the liquid and the solid structure with a pattern so that an upper part of the pattern is projected onto the solid structure to form an upper projected pattern and a lower part of the pattern is projected onto the interior area of the surface of the liquid to form a lower projected pattern; an image acquisition system arranged to acquire an image of the upper projected pattern and an image of the lower projected pattern; and a processor programmed to analyse the image of the upper projected pattern to determine a height of the edge of the surface of the liquid, and to analyse the image of the lower projected pattern to determine a characteristic of the interior area of the surface of the liquid.

In a preferred embodiment the pattern comprises a set of parallel lines, which are preferably equidistant. Alternatively the pattern may comprise dots, circles, grids or other patterns.

The solid structure typically comprises a wall of a tank which contains the liquid. Ideally the upper part of the pattern is projected onto two walls of the tank which meet at a corner. Alternatively the solid structure may comprise an internal structure, such as a pillar, within the tank.

The liquid may be water or any other liquid, but more preferably the liquid is a liquid fuel.

The image of the lower projected pattern may be analysed to determine a variety of different characteristics of the interior area of the surface of the liquid. For example a spatial frequency characteristic of the image may be determined, or the image may he analysed to detect a contaminant floating on the surface of the liquid. Alternatively the image of the lower projected pattern may he analysed to determine some other characteristic such as the height of the interior area of the surface of the liquid.

Typically analysing the image of the upper projected pattern to determine a height of the edge of the surface of the liquid comprises detecting discontinuities in the image of the upper projected pattern.

The pattern is typically an optical radiation pattern that is, a pattern of radiation in the optical part of the electromagnetic spectrum (which includes ultraviolet radiation, visible light, and infrared radiation). Typically the wavelength of the radiation is in the range of 100 nm to 1 mm.

The image of the lower projected pattern and the image of the upper projected pattern may be acquired separately, but more typically they are subsets of a single image acquired from a wide field of view by an image capture device such as a camera.

The liquid may be stationary (for instance fuel in a fuel storage silo) or more typically the liquid is carried by a vehicle such as a truck or aircraft. Where the liquid is carried by a vehicle then typically the method is performed when the vehicle is in motion (causing the surface of the liquid to be non-planar due to vibration and coarse motion of the vehicle).

The method may be performed as part of a method of determining a volume of a liquid, the method comprising measuring a surface of the liquid by the method of the first aspect; and determining the volume of the liquid in accordance with the determined height of the edge of the surface of the liquid.

Optionally the volume of the liquid is determined in accordance with both the determined height of the edge of the surface of the liquid and the determined characteristic of the image of the lower projected pattern. In other words, the characteristic is used to obtain a more accurate estimation of the volume.

Optionally an attitude of the liquid is determined in accordance with the determined height of the edge of the surface of the liquid at three or more measurement points.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
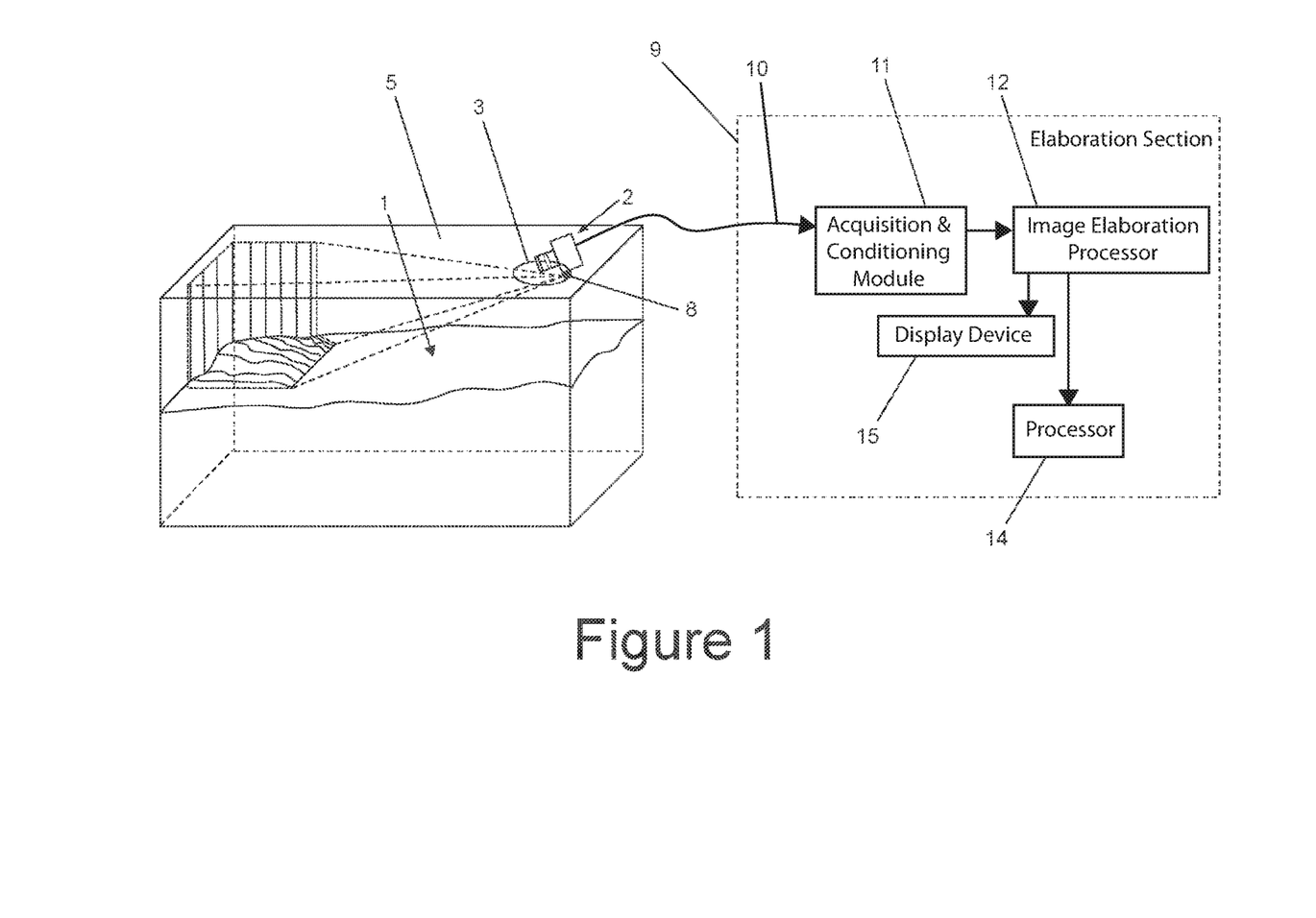
FIG. 1 shows an aircraft fuel tank and a camera-based system for measuring a surface of fuel in the tank.

FIG. 1 is a schematic view of an aircraft fuel tank system comprising a fuel tank, and apparatus for measuring a surface 1 of fuel in the fuel tank. A camera 2 can view into the fuel tank through an optical access window 3 in a top wall 5 of the fuel tank, in a position where the wall 5 is not normally covered in fuel. The window 5 has hydrophobic coatings to minimise problems with condensation, fog, frost and microbial growth. The camera 2 can acquire and digitise images of the field of the view of the camera. These images are transmitted to an acquisition and conditioning module 11 of an image acquisition and elaboration section 9 via an electrical harness 10.

The interior of the fuel tank is illuminated with structured radiation from a structured radiation source 8 (such as a light emitting diode) or other illuminator mounted close to the camera 2. The structured radiation is typically optical radiation—that is, radiation in the optical part of the electromagnetic spectrum (which includes ultraviolet radiation, visible light, and infrared radiation). Typically the wavelength of the radiation is in the range of 100 nm to 1 mm. In the description below it is assumed that the radiation is visible light.

The fuel tank is shown schematically with a parallelepiped structure with front and rear walls, left and right side walls, a bottom wall and a top wall. The camera 2 is pointed towards a corner of the fuel tank, with a large field of view. This wide field of view creates image distortion. An image elaboration (correction) processor 12 shown in FIG. 1 applies a predetermined correction coefficient matrix to the images in order to correct for this distortion.

The corrected images can then be output to a display device 15 for display to a pilot of the aircraft during flight of the aircraft, or to ground crew during refuel and ground operations.

The camera 2 may be an optical camera, or a thermal camera which could be used to check temperature distribution of the components of the fuel system (for instance fuel pumps) as well as being used to provide images for determination of fuel level (as described herein).

An estimation of the fuel surface height (along with the attitude, volume and mass of the fuel) is determined by a processor 14. The algorithm used by the processor 14 will now be described with reference to FIG. 2.

Figure 2:
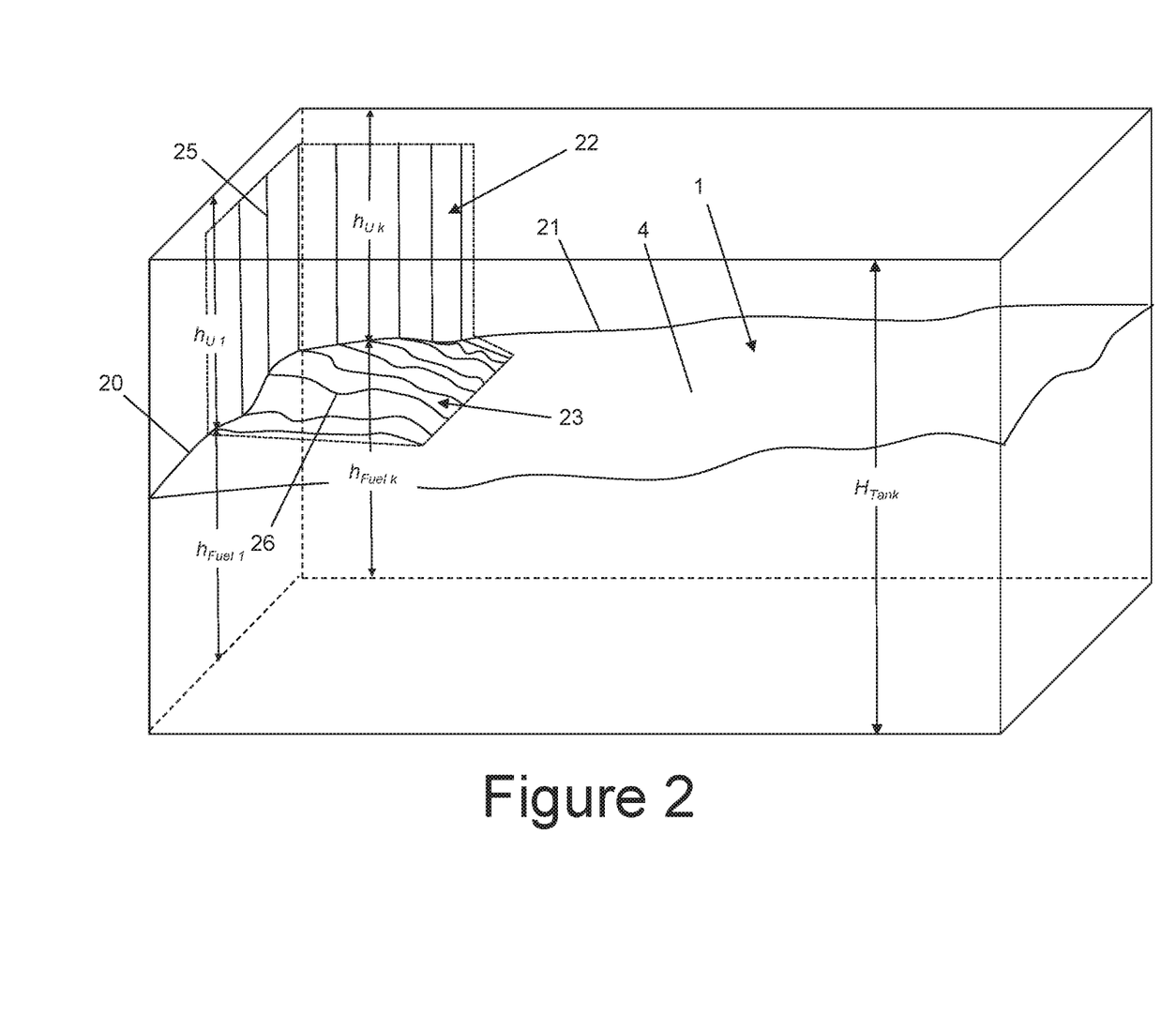
FIG. 2 is an enlarged view of the tank.

As shown in FIG. 2, the surface 1 of the fuel has an edge 20 where it contacts the left wall of the fuel tank, and an edge 21 where it contacts the front wall of the fuel tank. The surface 1 also has an interior area 4 which is not in contact with any of the walls of the fuel tank. The structured light source illuminates the surface 1 of the liquid and the left and front walls of the fuel tank with a visible light pattern of equidistant parallel lines. An upper part of the pattern is projected onto the walls of the fuel tank to form an upper projected pattern 22 and a lower part of the pattern is projected onto the surface 1 of the liquid to form a lower projected pattern 23. In this example the walls of the fuel tank are vertical and planar so the lines in the upper projected pattern 22 are also vertical and planar. The surface 1 of the fuel on the other hand is approximately horizontal but has a non-planar shape due to ripple and slosh caused by motion of the aircraft. Hence the lines in the lower projected pattern 23 have a complex wavy shape.

The field of view of the camera is sufficiently wide to acquire images of both the upper and lower projected patterns 22, 23 regardless of the height of the fuel. The processor 14 is programmed to analyse the image of the upper projected pattern 22 to determine a height of the edge of the surface of the liquid as follows. Firstly each line in the image of the upper projected pattern 22 is analysed to detect the discontinuity at the edge 20, 21 of the fuel surface. Taking as an example the third line in the pattern, this line has a straight portion 25 in the upper projected pattern 22, a wavy portion 26 in the lower projected pattern 23, and a discontinuity at the edge 20 where the straight portion 25 meets the wavy portion 26. This discontinuity may be detected in a number of ways, but by way of example the processor may analyse the angle between points along the vertical line, and detect when the angle indicates that the line is no longer straight (that is, at the discontinuity). If the walls of the tank have a more complex non-planar geometry then the processor 14 may store a model of the expected upper projected pattern 22 (which is known for a given tank wall geometry) and compare the image of the pattern with the stored model. Deviation of the image from the stored model indicates the edge of the surface of the liquid. Alternatively a neural network may be used.

Once the position of the discontinuity is known, then an ullage height from the top of the fuel tank can be determined by counting the number of pixels from the top of the projected line to the discontinuity. This ullage height is labelled $H_{u\ 1}$ for the first line and $H_{u\ k}$ for the kth line. The height of the tank ($H_{Tank}$) is known so the height of the fuel is given by: $H_{uFuel\ 1} = H_{Tank} - H_{u\ 1}$ and $H_{uFuel\ k} = H_{Tank} - H_{u\ k}$, where $H_{uFuel\ k}$ is the fuel height from the bottom of the tank associated with the kth line.

The height and attitude of the fuel surface 1 can be determined from these heights $H_{uFuel\ 1}$ to $H_{uFuel\ k}$ at the edge of the surface, along with a certain amount of information about the shape of the surface (ripples in the surface being observable at its edges). However the fuel heights $H_{uFuel\ 1}$ to $H_{uFuel\ k}$ at the edge of the surface give no information about the shape of the interior area 4 of the surface 1 (that is, those parts of the fuel surface 1 which are not in contact with the walls of the tank). Hence the processor 14 also analyses the image of the lower projected pattern 23 to determine the non-planar shape of the interior area of the surface 1 of the liquid.

First the processor 14 analyses the image to determine a number of points along each wavy line 26 in the image. Next the processor 14 performs a 1D interpolation to give the fine structure of the wavy line 26. The same process is repeated for all the other wavy lines projected onto the surface 1. The processor 14 then performs a 2D interpolation of all the wavy lines to obtain a model of the fine structure of the 2D surface identified by the lower projected pattern 23 (within the field of view of the camera 2). Next the processor 14 performs a 2D fourier transform (for instance applying a fast fourier transform algorithm—FFT) to determine a spatial frequency characteristic of the surface identified by the lower projected pattern 23. This spatial frequency characteristic is then assumed to apply to the whole surface 1 (not just the part of the surface within the field of view of the camera 2) and used by the processor 14 to accurately model the non-planar shape of the interior area 4 of the surface 1. From this modelled non-planar shape the processor 14 can then obtain an improved estimation of the volume of fuel given that the geometry of the tank is known. The same image analysis process can be applied using different projected patterns (such as dots, circles, grids or other patterns) as long as the fine structure of the 2D surface can be rebuilt and the 2D fourier transform can be applied.

Thus the volume of the liquid is determined not only in accordance with the the fuel heights to $H_{uFuel\ 1}$ at $Hu_{Fuel\ k}$ the edge of the surface, but also in accordance with the spatial frequency characteristic of the image of the lower projected pattern 23.

If the volume was estimated using only the fuel heights $H_{uFuel\ 1}$ to $H_{uFuel\ k}$ at the edge of the surface, then it would be necessary to assume that the liquid surface is a flat plane. When the fine 2D structure of liquid surface is measured, the 2D fourier transform can he applied and this gives the characteristic spatial frequencies in the field of view of the camera 2, i.e. the dominant frequencies. It is assumed that the characteristic spatial frequencies in the entire liquid surface are the same as in the field of view of the camera 2. Therefore, the processor 14 can build a model of the entire liquid surface having the same spatial "pattern" (based on the measured characteristic spatial frequencies). This gives a more accurate representation of the liquid surface itself (not just a flat plane).

If sloshing of the liquid increases in the tank, a method based on only the fuel heights $H_{uFuel\ 1}$ to $H_{uFuel\ k}$ at the edge of the surface and a flat surface model) could give a significant volume measurement error.

This process can be used by the processor 14 to estimate the volume/mass of fuel in a fuel tank which is not a parallelepiped, as long as the geometry of the tank is known. In such a case the volume of fuel can be estimated from the heights of the fuel surface based on a look-up table, a neural network, or a computer model of the tank geometry.

The display device 15 can be used by the pilot or ground crew to view the image of the upper projected pattern 22 and the lower projected pattern 23. This will give a rough indication of the fuel height (by visual identification of the discontinuities in the projected pattern) and in turn a rough indication of the volume of fuel into the tank. The visualisation of the lower projected pattern 23 will also give a rough indication of the amount of ripple or slosh in the fuel surface. Also any high amplitude, low spatial-frequency, long-lasting deviations in the wavy lines of the displayed image may indicate the presence of a contaminant floating on the surface of the liquid.

Optionally the processor 14 is programmed to analyse the image of the lower projected pattern 23 and generate an automatic alarm on the display device 15 if it detects a contaminant floating on the surface of the liquid. The detection of such a contaminant will also cause the processor to ignore the data from this part of the image when calculating the fuel volume, leading to a more accurate estimate of the fuel volume.

Figure 2A:
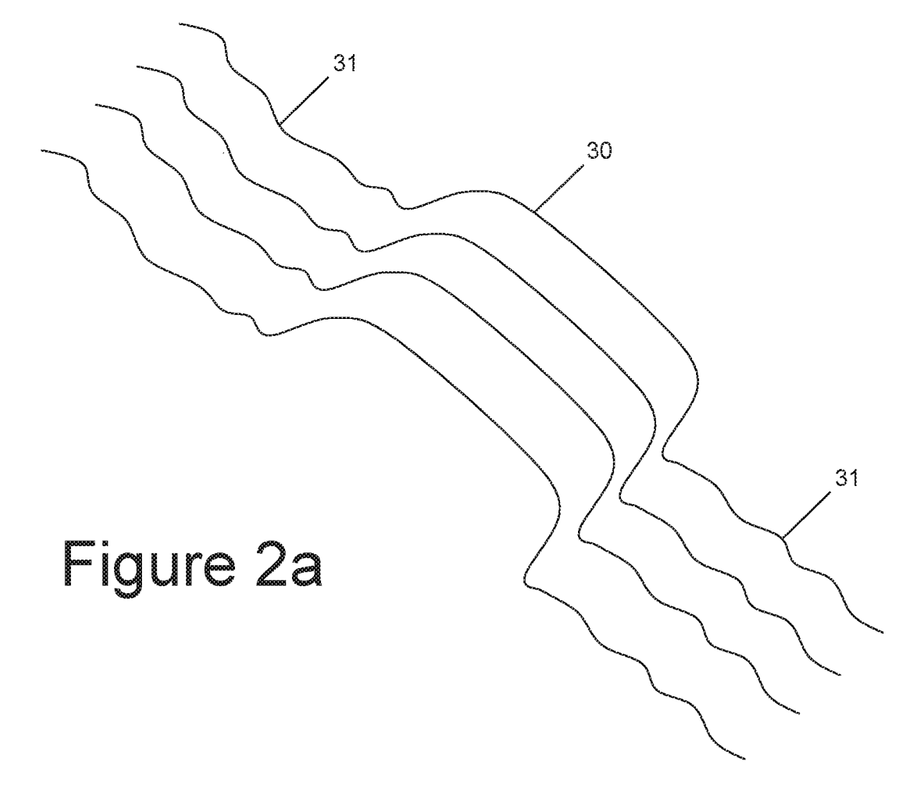
FIG. 2a shows four lines in the projected light pattern on the fuel surface.

This principle is illustrated in FIG. 2*a*, which shows four adjacent lines in the image of the lower projected pattern 23. Each line has a large amplitude low spatial-frequency deviation 30 which remains over a long period of time, indicating the presence of a contaminant floating on the surface of the liquid. Each side of the contaminant the lines have small amplitude deviations 31 with a high spatial-frequency and which change rapidly with time (due to rippling). Thus the processor 14 ignores the data from these parts 30 of the image when mode the surface 1, and optionally generates an alarm.

Figure 3:
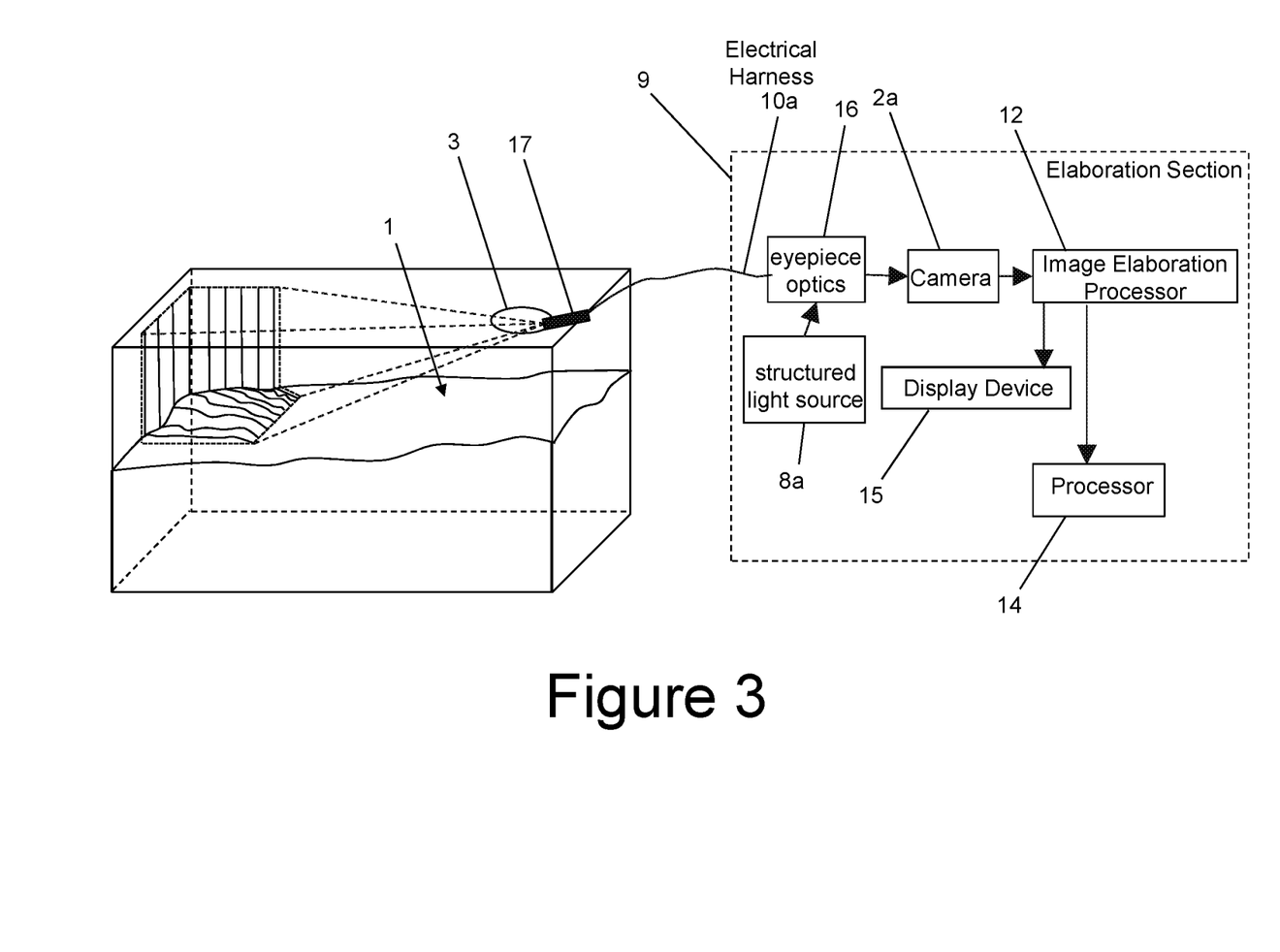
FIG. 3 shows an aircraft fuel tank and an optical-fibre-based system for measuring a surface of fuel in the tank.
Figure 4:
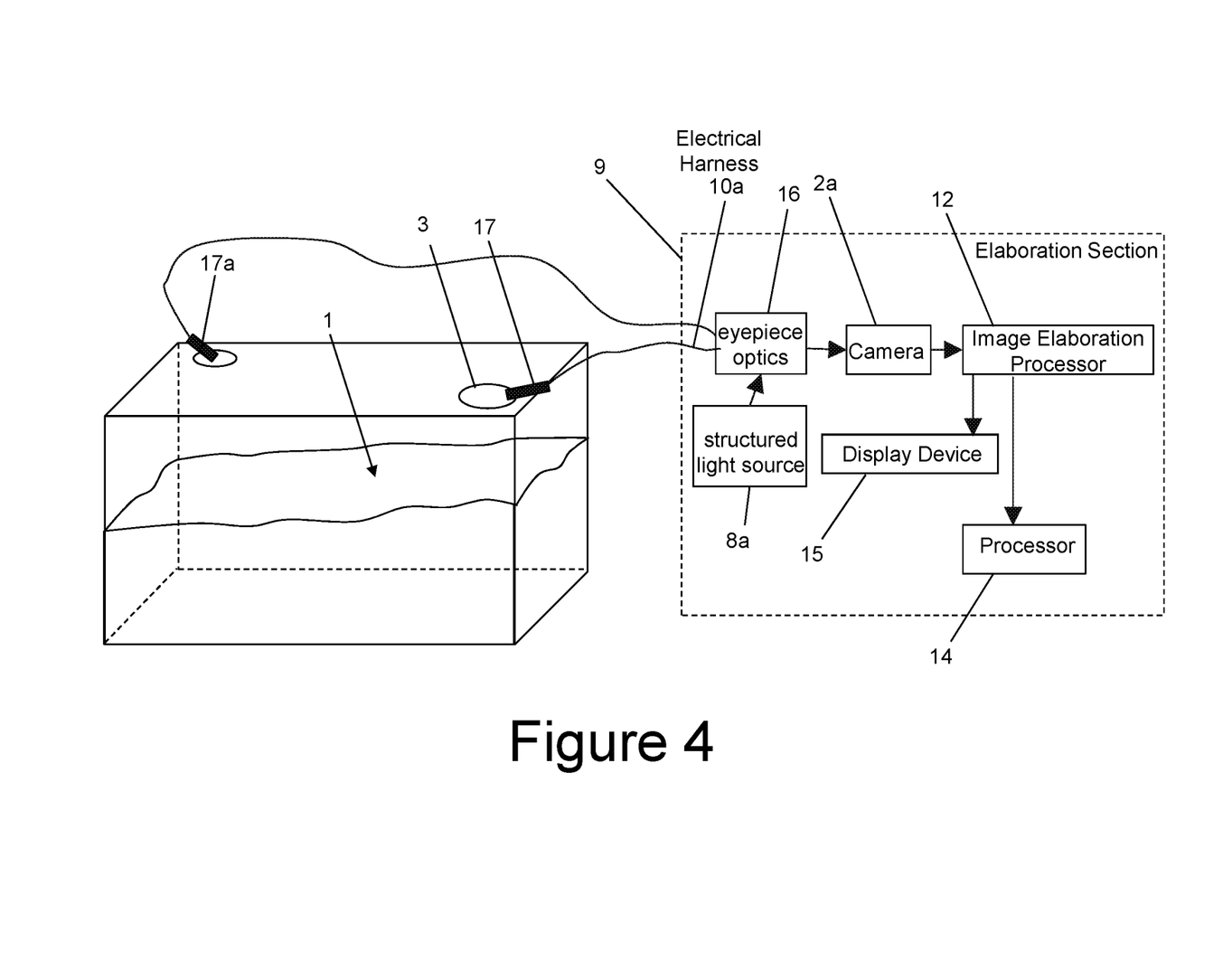
FIG. 4 shows an aircraft fuel tank and an optical-fibre-based system for measuring a surface of fuel in the tank incorporating two fibrescopes.

FIG. 3 is an alternative embodiment with an optical-fibre based image acquisition system. A structured light source 8*a* directs structured light into an optical fibre bundle 10*a* via eyepiece optics 16. The structured light is then directed into the fuel tank by a fibrescope 17. Reflected light is received by the assembly 17 which it transmits to a camera 2*a* via the optical fibre bundle 10*a* and eyepiece optics 16. FIG. 4 gives a similar example—in this case with two fibrescopes 17, 17*a* illuminating opposite corners of the fuel tank to provide a more accurate representation of the fine structure of the surface 1.

Figure 5:
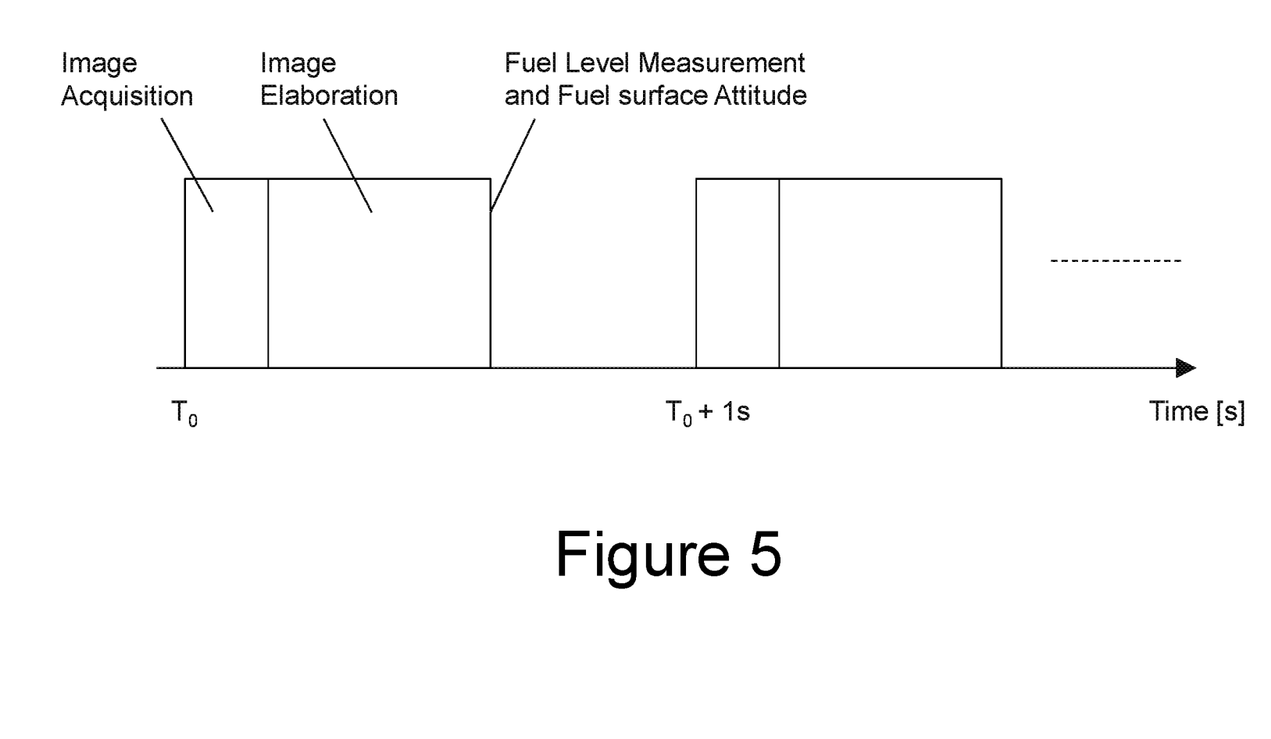
FIG. 5 shows a process for making a series of measurements.

The image acquisition and elaboration must be performed in real-time to allow a refresh time of the fuel quantity indication of 1 s (1 Hz refresh rate) minimum as illustrated in FIG. 5. To allow this, a Digital Signal Processor (DSP) or similar high performance processors might be used for elements 11, 12 and 14 in FIG. 1.

FIG. 5 shows two measurements spaced apart by 1 s. Optionally the two fibrescopes 17, 17*a* may be operated alternately (rather than simultaneously) so they are not "blinded" by light from the other assembly.

Figure 6:
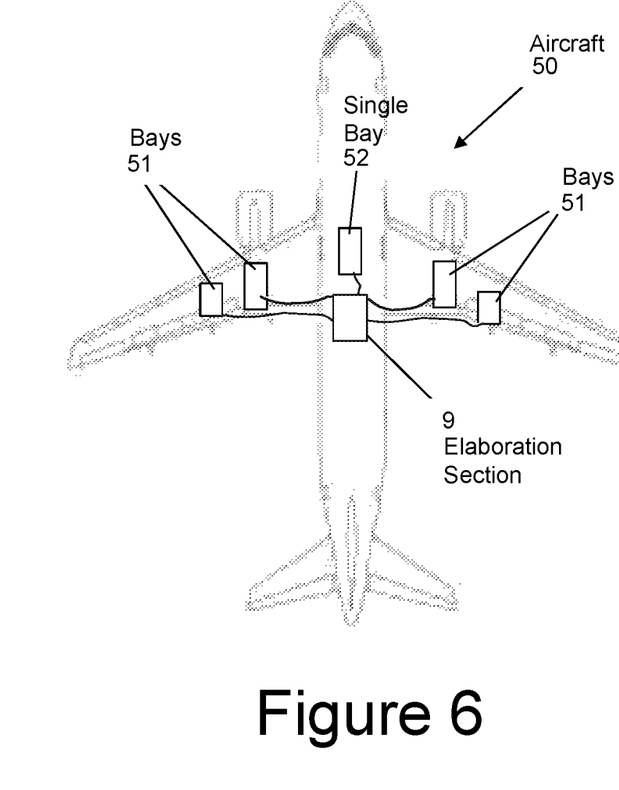
FIG. 6 shows an aircraft with a centralised processing architecture for monitoring fuel.

FIG. 6 is a plan view of an aircraft 50 incorporating the system of FIG. 1. The aircraft has a wing fuel tank in each wing, and a centre fuel tank under the fuselage. Each fuel tank is divided into a number of bays, each bay being separate from an adjacent bay by a rib which has holes allowing fuel to move between the adjacent bays. FIG. 6 shows two bays 51 of each wing fuel tank and a single bay 52 of the centre fuel tank. Each one of the five bays has a pair of fiberscopes installed as shown in FIG. 4. In the architecture of FIG. 6 each optical fibre bundle leads to a single centralised image elaboration and elaboration section 9 in a pressurised and conditioned area.

Figure 7:
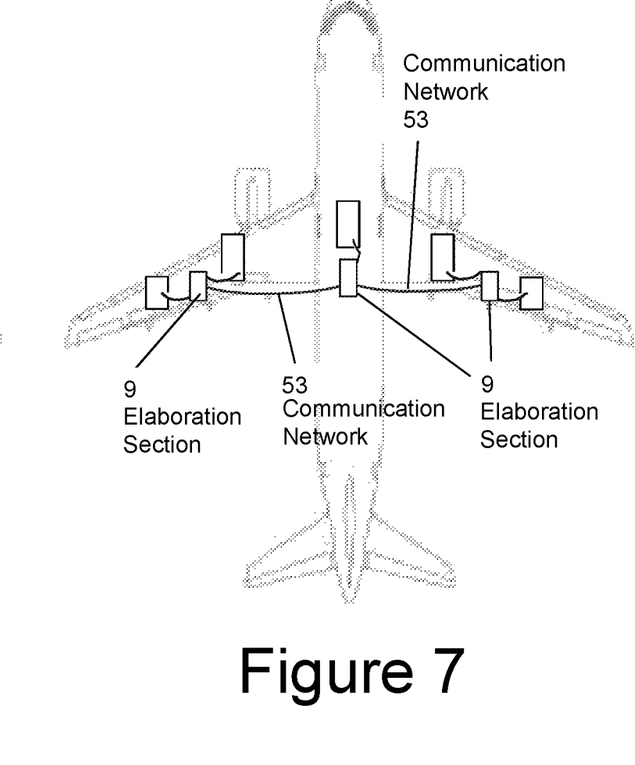
FIG. 7 shows an aircraft with a distributed processing architecture for monitoring fuel.

FIG. 7 shows an alternative localised architecture in which three image elaboration and elaboration sections 9 are provided closer to the bays thus reducing the length of optical fibre bundle required. The elaborated data may be transferred to a central one of the sections 9 via an electrical or optical communication network 53.

Although the invention has been described above with reference to one or more preferred embodiments, it will be appreciated that various changes or modifications may be made without departing from the scope of the invention as defined in the appended claims.

The invention claimed is:

1. A method of measuring a surface of a liquid, the surface of the liquid having an edge which contacts a solid structure and an interior area which does not contact the solid structure, the method comprising:
   illuminating a portion of the surface of the liquid and the solid structure with a pattern from an illuminator, the pattern having an upper part and a lower part, wherein the upper part of the pattern is projected onto the solid structure to form an upper projected pattern and the lower part of the pattern is projected onto a part less than all of the interior area of the surface of the liquid to form a lower projected pattern;
   acquiring an image of the upper projected pattern; analysing the image of the upper projected pattern to determine a height of the edge of the surface of the liquid;
   acquiring an image of the lower projected pattern; and
   analysing the image of the lower projected pattern to determine a characteristic of the interior area of the surface of the liquid by determining a spatial frequency characteristic of the image of the lower projected pattern.

2. The method of claim 1 wherein the pattern comprises a set of parallel lines, dots, circles or grids.

3. The method claim 1 wherein the solid structure comprises a wall of a tank which contains the liquid.

4. The method of claim 1 wherein the liquid is a liquid fuel.

5. A method of measuring a surface of a liquid, the surface of the liquid having an edge which contacts a solid structure and an interior area which does not contact the solid structure, the method comprising:
   illuminating a portion of the surface of the liquid and the solid structure with a pattern from an illuminator, the pattern having an upper part and a lower part, wherein the upper part of the pattern is projected onto the solid structure to form an upper projected pattern and the lower part of the pattern is projected onto a part less than all of the interior area of the surface of the liquid to form a lower projected pattern;
   acquiring an image of the upper projected pattern; analysing the image of the upper projected pattern to determine a height of the edge of the surface of the liquid;
   acquiring an image of the lower projected pattern; and
   analysing the image of the lower projected pattern to detect a contaminant floating on the surface of the liquid.

6. The method of claim 1 wherein analysing the image of the upper projected pattern to determine a height of the edge of the surface of the liquid comprises detecting discontinuities in the image of the upper projected pattern.

7. The method of claim 1 wherein the pattern is an optical radiation pattern.

8. The method of claim 1 wherein the liquid is carried by a vehicle.

9. The method of claim 8 wherein the vehicle is an aircraft.

10. A method of estimating a volume of a liquid, the method comprising measuring a surface of the liquid by the method of claim 1; and estimating the volume of the liquid in accordance with the determined height of the edge of the surface of the liquid.

11. The method of claim 10 wherein the volume of the liquid is estimated in accordance with both the determined height of the edge of the surface of the liquid and the determined characteristic of the image of the lower projected pattern.

12. An apparatus for measuring a surface of a liquid, the surface of the liquid having an edge which contacts a solid structure and an interior area which does not contact the solid structure, the apparatus comprising:
    an illuminator arranged to illuminate a portion of the surface of the liquid and the solid structure with a pattern having an upper part and a lower part, wherein the upper part of the pattern is projected onto the solid structure to form an upper projected pattern and the lower part of the pattern is projected onto a part less than all of the interior area of the surface of the liquid to form a lower projected pattern; an image acquisition system arranged to acquire an image of the upper projected pattern and an image of the lower projected pattern; and
    a processor programmed to analyse the image of the upper projected pattern to determine a height of the edge of the surface of the liquid, and to either: analyse the image of the lower projected pattern to detect a contaminant floating on the surface of the liquid; or, analyse the image of the lower projected pattern to determine a characteristic of the interior area of the surface of the liquid by determining a spatial frequency characteristic of the image of the lower projected pattern.

13. An aircraft comprising a fuel tank; and apparatus according to claim 12 for measuring a surface of liquid fuel in the fuel tank.

14. The method of claim 5 wherein the pattern comprises a set of parallel lines, dots, circles or grids.

15. The method claim 5 wherein the solid structure comprises a wall of a tank which contains the liquid.

16. The method of claim 5 wherein the liquid is a liquid fuel.

17. The method of claim 5 wherein analysing the image of the upper projected pattern to determine a height of the edge of the surface of the liquid comprises detecting discontinuities in the image of the upper projected pattern.

18. The method of claim 5 wherein the pattern is an optical radiation pattern.

19. The method of claim 5 wherein the liquid is carried by a vehicle.

20. The method of claim 19 wherein the vehicle is an aircraft.

* * * * *